Dec. 18, 1951     D. O. HUBBARD     2,579,234
VACUUM SEAL FOR FLUORINE GENERATION SYSTEM
Filed Feb. 4, 1946
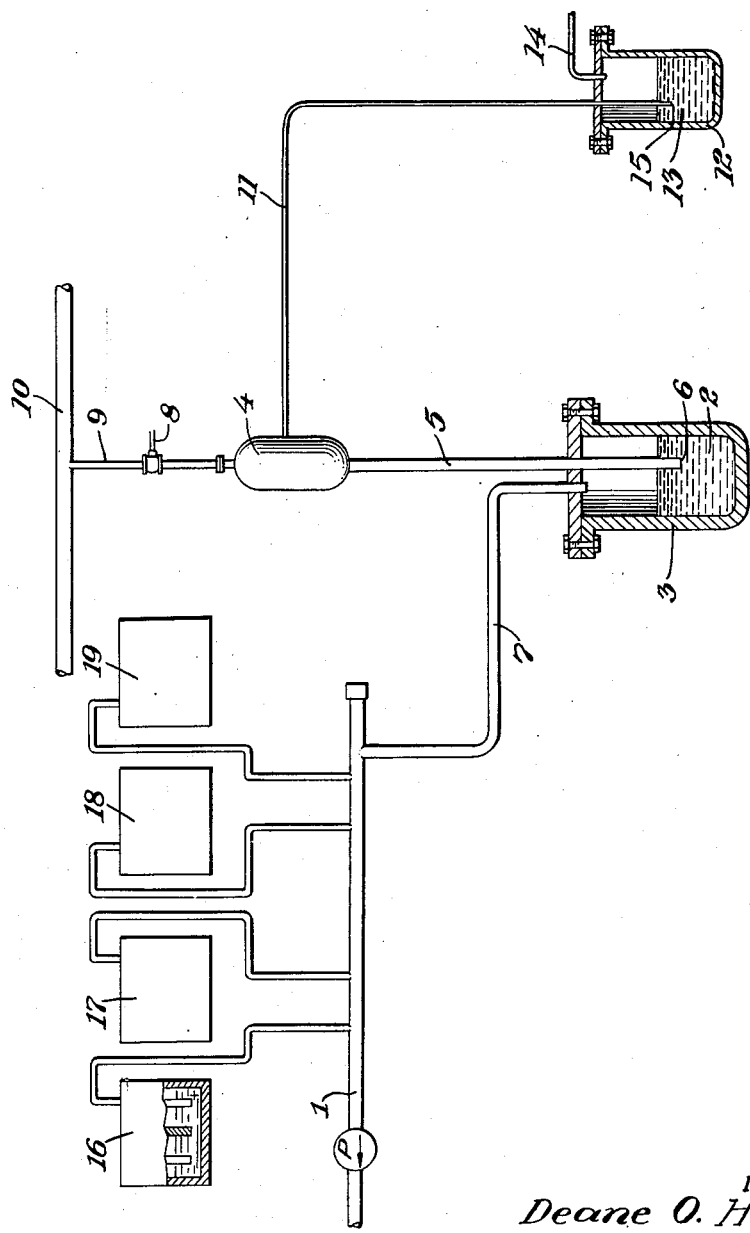
INVENTOR.
Deane O. Hubbard.
BY Patented Dec. 18, 1951

2,579,234

UNITED STATES PATENT OFFICE 2,579,234

VACUUM SEAL FOR FLUORINE GENERATION SYSTEM

Deane O. Hubbard, Niagara Falls, N. Y., assignor to the United States of America as represented by the United States Atomic Energy Commission Application February 4, 1946, Serial No. 645,469

8 Claims. (Cl. 204—247)

This invention relates to a method and apparatus for preventing evacuation of electrolytic gas generating cells, and more particularly for preventing evacuation of electrolytic cells for the generation of gaseous halogens or other corrosive gases.

Gaseous halogens, for example chlorine and fluorine and compounds thereof, such as hydrogen fluoride and the like can be generated in electrolytic cells. For instance, one of the most widely employed methods of producing fluorine is that involving the electrolysis of a fused anhydrous electrolyte containing a ratio of about 1 mol of potassium fluoride and about 2 mols of hydrogen fluoride. The electrolysis is conducted by immersing carbon electrodes in the electrolyte and passing a current therethrough. Fluorine is generated at the anode and hydrogen at the cathode. This process is preferably conducted at substantially atmospheric pressure.

The term "vacuum" employed in this specification and appended claims relates to subatmospheric pressures, a measurement of −2 inches of water meaning 2 inches of water below atmospheric pressure, the gauge indication of atmospheric pressure being zero. Further, the term "vacuum" is not to be construed as defining total evacuation since the term is used in its generally accepted meaning in the engineering profession, that is, a "partial vacuum" or "reduced pressure," the latter term being used interchangeably with the term "vacuum" herein.

In an electrolytic process for the generation of fluorine, it is necessary to prevent evacuation of the electrolytic cells during the generation cycle, it being usually highly desirable or necessary to maintain the pressure in the cells and in the header which collects the gases generated in the cells within the limits of −2 to +4 inches of water. This is necessary primarily due to the presence of a barrier between the anode and cathode which extends a predetermined distance down into the electrolyte, thereby separating the generated gas rising from the anode from that generated at the cathode, thereby preventing possible contamination of the desired generated gas and the more serious hazard of explosion due to a reaction between the fluorine generated at the anode and the hydrogen generated at the cathode. In order that this barrier may perform the desired function, it is necessary that the liquid level of electrolyte remain at a predetermined distance above the bottom of the barrier. Any evacuation of the cell or creation of excess positive pressure within the cell beyond the limits set forth above may cause a corresponding change in the liquid level of the electrolyte to such an extent that this liquid level would fall on one side of the barrier to a point below the bottom of the barrier, thereby permitting the fluorine gas to come in contact with the hydrogen generated at the cathode.

It therefore became desirable to develop a method and apparatus for sealing the fluorine generating cells to prevent their evacuation during the withdrawing of the generated gas from the anode side.

There are several methods employed in withdrawing the generated gas from the cell, for example, condensers are widely used as well as pressure pumps for this purpose. In the employment of either of these methods there is a great possibility of the reduced pressure developing to a dangerous point within the cells and cell headers. Under normal conditions of operation, a manually or automatically operated by-pass around the pumps or condensers would probably prevent undue reduced pressure developing. However, under some conditions this by-pass may not be sufficient or may not operate properly and where corrosive and highly toxic gases are being handled it is necessary to equip such a generation system with a vacuum relief valve located at the cell headers which will admit an inert gaseous medium under positive pressure in the case of the development of a vacuum. If, however, the by-pass system was of insufficient size or for any reason ceased to perform its desired function the possibility exists of the vacuum drawing the inert gaseous medium into the system and passing it on to storage facilities with the generated gas, thus reducing the quality of the cell product.

It is an object of this invention to provide a method for preventing undue evacuation of electrolytic gas generating cells.

It is a further object of this invention to provide a method for maintaining pressure conditions within an electrolytic gas generating cell within certain desired limits.

It is another object of this invention to provide a method whereby an undesirable degree of reduced pressure created in electrolytic gas generating cells is broken by introduction of a gaseous medium inert in the presence of gaseous halogens.

It is still another object of this invention to provide a method whereby a vacuum created in electrolytic gas generating cells is broken and wherein no moisture or oxygen is permitted to leak into the system.

It is still another object of this invention to provide a method for preventing the evacuation of electrolytic gas generating cells wherein a liquid medium, inert in the presence of gaseous halogens, is employed as a sealant between the generated gas and the inert gaseous medium employed to break the vacuum.

It is yet another object of this invention to provide an apparatus to hydraulically seal an electrolytic gas generating system thus preventing the evacuation of said system.

These and other objects of this invention will become apparent to those skilled in the art upon becoming familiar with the following description when taken in conjunction with the accompanying drawing.

The invention described herein provides a hydraulic sealing method in which an inert gas is introduced into the cells and cell header under a maximum pressure of 4 inches of water and acts to break a vacuum in said cells and cell header before is exceeds a limit of —2 inches of water. The gas seal is maintained by the use of an inert liquid sealant between the cell and the source of the inert gas used to break the vacuum, wherein a pressure-liquid level balance is maintained under normal operating conditions. A vacuum approaching the allowable limit in the cell and cell header causes the pressure-liquid level relationship to become unbalanced permitting the inert, vacuum breaking gas to escape into the evacuated zones under sufficient positive pressure to break the vacuum.

The following detailed description applies to an existing embodiment of this invention and whereas the description is typical of a practical application of this invention, it should be understood that it is not to be construed as limiting the scope of this method and apparatus to the embodiment set forth therein.

An illustrative embodiment of this invention is shown in the accompanying drawing. In the drawing, 3 is a vacuum seal pot containing a predetermined quantity of inert liquid sealant 2, the level of which within vacuum seal pot 3 is maintained in predetermined relationship with the open end 6 of conduit 5 which extends into vacuum seal pot 3 to a predetermined distance below the level of sealant 2. A conduit 7 connects vacuum seal pot 3 with cell header 1 which is fed by a plurality of conduits connecting cell header 1 to a plurality of electrolytic gas generation zones. The gas generation system comprising a plurality of electrolytic gas generation zones may be any standard electrolytic gas generation system, preferably under substantially atmospheric pressure, such as that described earlier in this specification, and positioned as generally indicated diagrammatically at 16, 17, 18, and 19 on the drawing, cell 16 being partly broken away showing the barrier between the electrode as previously described.

Conduit 5 connects vacuum seal pot 3 with a pressure surge tank 4 which contains an inert gas under predetermined pressure, said gas being admitted thereto through conduit 9 and pressure control valve 8 located in conduit 9, said conduit 9 being connected to gas header 10. Conduit 11 connects pressure surge tank 4 to auxiliary seal pot 12 containing a predetermined amount of liquid sealant 13 the liquid level of which is maintained in predetermined relationship with conduit 11 which extends into auxiliary seal pot 12 to a predetermined distance below the liquid level of liquid sealant 13. Conduit 14 connects auxiliary seal pot 12 to a vent line which does not appear on the accompanying drawing since it is not a part of the invention disclosed herein.

In order that the operation of the above described apparatus may be more clearly understood, it is assumed that gas is being generated in electrolytic generation zones at substantially atmospheric pressure and said gas is being withdrawn through cell header 1. Referring to the accompanying drawing, as a vacuum in cell header 1 approaches the allowable limit of —2 inches of water, the sealant fluid 2, a material which is inert in the presence of the electrolytically generated gaseous halogen being processed, such as fluorine, rises in vacuum seal pot 3. The liquid sealant may be, for example, phosphoric acid, sulphuric acid, or certain mixtures containing sulfuric acid such as a mixture containing 95% by weight of 98% sulfuric acid and 5% by weight of 70% nitric acid. An inert, moisture free gas such as dry nitrogen, under a positive pressure of 6 inches of water, contained in surge tank 4 and line 5 forces the level of the liquid sealant in line 5 down. When the vacuum in header 1 has reached the allowable limit, the sealant fluid contained in line 5 is forced out of that line by the increased pressure differential allowing the inert gas to exit from line 5 at opening 6 and to bubble through the sealant fluid 2 and emerge into the evacuated zone of the seal pot 3 and thence through line 7 into cell header 1, thus breaking the condition and relieving the vacuum in the cells and header. As the pressure increases in the cells and header due to the introduction of the inert gas, the liquid level of the sealant in the seal pot 3 falls and the liquid sealant again enters line 5 at opening 6 thereby preventing further passage of inert gas from surge tank 4 into the gas generating system.

A positive pressure of 6 inches of water is maintained in surge tank 4 by means of a pressure control valve 8 in inlet line 9 which admits additional inert gas from header 10. The pressure control valve 8 is set to open when the pressure in surge tank 4 falls below 6 inches of water. In the case of failure of pressure control valve 8 to close at the proper time, in which case a positive pressure in excess of 6 inches of water builds up in surge tank 4, the excess inert gas is vented off through relief line 11 to auxiliary seal pot 12 in which a liquid sealant, similar to that which is contained in seal pot 3, is maintained at a liquid level such that a pressure of inert gas in excess of 6.5 inches of water is caused to exit from relief line 11 at outlet 15 and discharge into vent line 14.

While this invention has been described with reference to a particular embodiment and with reference to certain particular forms of apparatus, it is to be understood that the invention is not limited thereby. Therefore, changes, additions, and/or omissions may be made without departing from the spirit of my invention as defined in the appended claims which are intended to be limited only as required by the prior art.

For example, the method of this invention has been described with reference to certain liquid and gaseous sealants. Broadly speaking, the selection of proper liquid and gaseous sealants is entirely contingent upon the physical and chemical constants obtaining for the electrolytically generated gas being processed, and it is in no sense limited to the examples cited in the foregoing description. For example, a fluorinated or chlorinated hydrocarbon liquid sealant having physical and chemical characteristics particularly adapted for use with fluorine or chlorine respectively may be substituted for the liquid sealant cited in the exemplary embodiment described above. Other relatively inert gases such as perfluorinated n-heptane and the rare gases, for example helium, argon, neon and the like, may be substituted for nitrogen as a gaseous sealant and, although a completely moisture-free gas is preferred, the successful operation of this process is not contingent upon the use of dry inert gases, ordinary commercial grade nitrogen or other relatively inert gases such as those mentioned above being satisfactory for this purpose.

I claim:

1. In an apparatus for electrolytically generating gaseous halogens in a generation zone and continuously and positively removing gases from said generation zone, means for preventing a vacuum in said generation zone in excess of a predetermined limit comprising a vacuum seal pot containing a predetermined quantity of sealant liquid, conduit means above the highest level of said sealant liquid for connecting said vacuum seal pot to said electrolytic gas generating apparatus, a pressure surge tank, means for maintaining a constant pressure in said pressure surge tank, and conduit means connecting said pressure surge tank to said vacuum seal pot and extending a predetermined distance into the sealant contained in said vacuum seal pot.

2. In an apparatus for electrolytically generating fluorine in a generation zone and continuously and positively removing fluorine from said generation zone, means for preventing a vacuum in excess of −2 inches of water in said fluorine generation apparatus comprising a vacuum seal pot containing a predetermined quantity of sealant liquid, conduit means for connecting said vacuum seal pot to said fluorine generation apparatus, said conduit means being connected to said seal pot above the highest level of said liquid, a pressure surge tank for containing an inert gas under a predetermined pressure, means for maintaining a constant pressure in said pressure surge tank, and conduit means connecting said pressure surge tank to said vacuum seal pot and extending a predetermined distance into the sealant contained in said vacuum seal pot.

3. An apparatus for providing a vacuum seal for a fluorine generation system comprising a gas generating cell having a barrier extending downwardly into the electrolyte to prevent admixture and reaction between anodic and cathodic gases, evacuating means connected to one side of the cell for continuously and positively removing gas from said one side of the cell, a pressure source of auxiliary gas connected to said one side of the cell for supplying gas thereto when the pressure drops below a predetermined magnitude, and a flow control device interposed in said connection for regulating the flow of gas therethrough, said device including a closed vessel having a sealant liquid trapped therein, said cell being connected to the vessel above the level of the liquid, and said source of auxiliary gas being connected to a tube extending downwardly through the vessel and terminating below the level of the liquid therein.

4. The structure of claim 3 wherein said pressure source includes a surge tank and a pressure regulating valve for regulating the pressure in the surge tank.

5. The structure of claim 3 wherein the said pressure source includes a surge tank and a vent line from the surge tank, said vent line having therein a flow control device of the type operative to vent auxiliary gas to atmosphere at a substantially predetermined pressure in the surge tank.

6. The structure of claim 3 wherein said pressure source includes a surge tank and a vent line connected thereto, said vent line having a flow control device therein in the form of a trap seal operative to vent auxiliary gas to the atmosphere at a substantially predetermined pressure in the surge tank.

7. In combination with a chamber for containing gas having a portion wherein it is desired to limit the reduction in pressure, a source of supply of auxiliary gas under positive pressure having connections to said portion, said connections including a closed vessel having sealant liquid trapped therein, said portion having a connection to said vessel above the liquid level therein, and said source of auxiliary gas having a connecting tube extending downwardly through said vessel and terminating below the level of the liquid in the vessel, said source of auxiliary gas including a surge tank and connections therefrom to a vent line including a closed vessel having sealant liquid trapped therein, the surge tank being connected to the closed vessel above the level of liquid therein, and the vent line having a connecting tube extending downwardly into the sealant liquid in the vessel.

8. In combination with a chamber for containing gas having a portion wherein it is desired to limit the reduction in pressure, a source of supply of auxiliary gas under positive pressure having connections to said portion, said connections including a closed vessel having sealant liquid trapped therein, said portion having a connection to said vessel therein, and said source of auxiliary gas having a connecting tube extending downwardly through said vessel and terminating below the level of the liquid in the vessel, said source of auxiliary gas including a surge tank and connections therefrom to a vent line including a closed vessel having sealant liquid trapped therein, the surge tank being connected to the closed vessel above the level of liquid therein, and the vent line having a connecting tube extending downwardly into the sealant liquid in the vessel, and a pressure regulating valve in the connections to the surge tank to regulate the pressure therein.

DEANE O. HUBBARD.

REFERENCES CITED

The following references are of record in the file of this patent:

UNITED STATES PATENTS

| Number | Name | Date |
|---|---|---|
| 1,484,733 | Mathers | Feb. 26, 1924 |
| 1,651,051 | Wiggins | Nov. 29, 1927 |
| 2,006,676 | Garrett | July 2, 1935 |
| 2,146,249 | Clayton | Feb. 7, 1939 |